Figure 1:
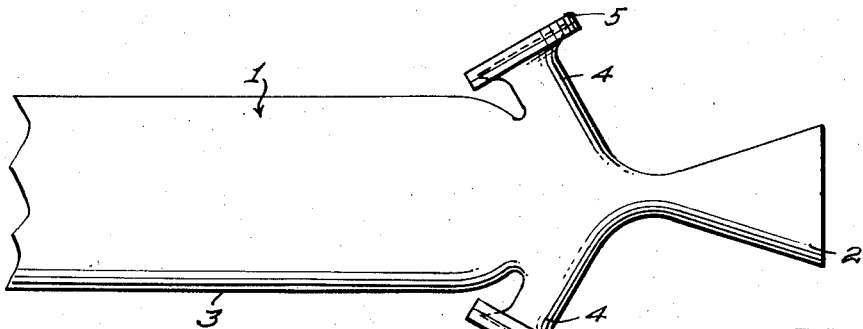

Sept. 9, 1958

H. S. SEIFERT 2,850,976

THRUST CANCELLATION DEVICE FOR USE IN SOLID
PROPELLANT ROCKET

Filed June 28, 1955

2 Sheets-Sheet 1

INVENTOR.
Howard S. Seifert

BY W. E. Thibodeau, A. W. Dew
and S. J. Rotondi
ATTORNEYS

Sept. 9, 1958 H. S. SEIFERT 2,850,976
THRUST CANCELLATION DEVICE FOR USE IN SOLID
PROPELLANT ROCKET
Filed June 28, 1955 2 Sheets-Sheet 2
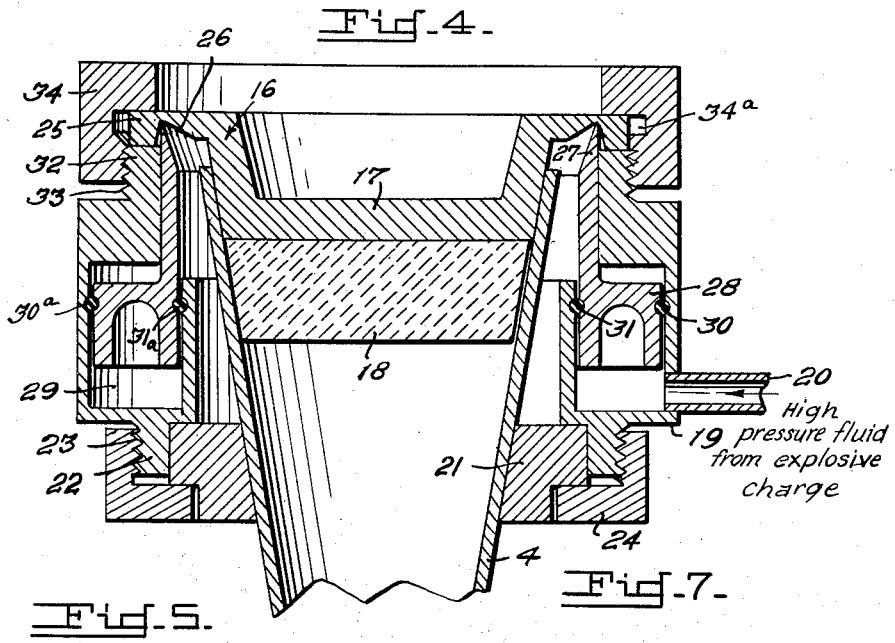
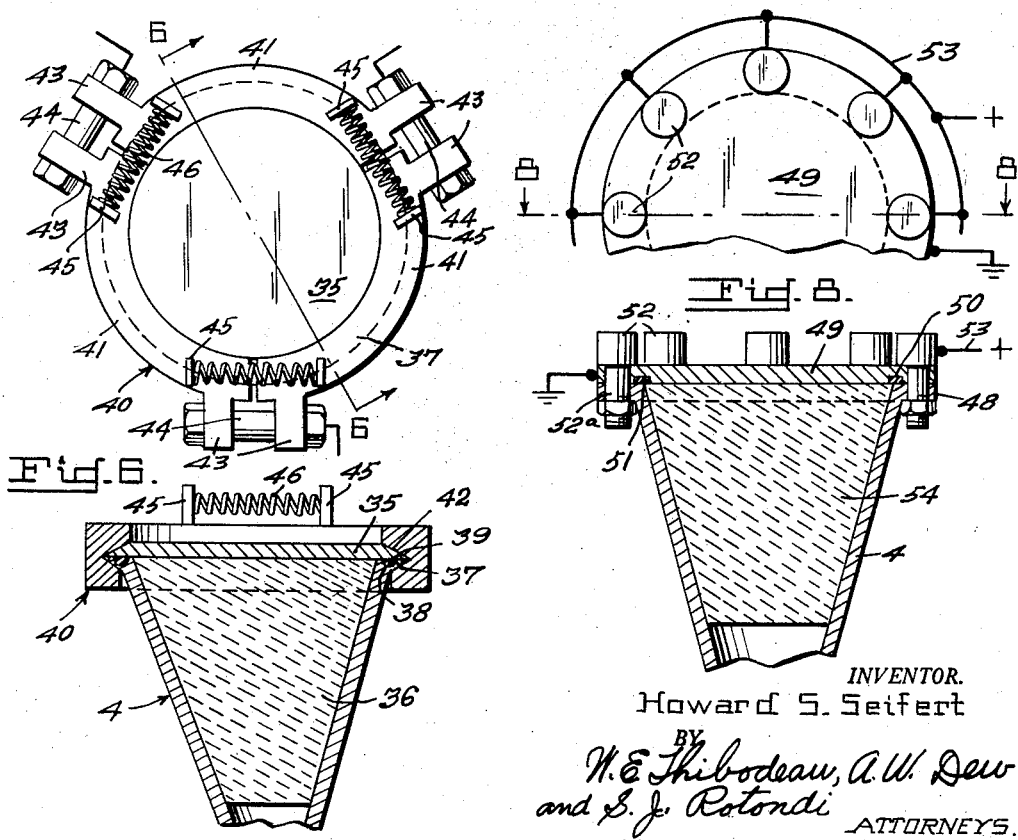
INVENTOR.
Howard S. Seifert
BY
W. E. Thibodeau, A. W. Dew
and S. J. Rotondi
ATTORNEYS.

United States Patent Office 2,850,976
Patented Sept. 9, 1958

2,850,976

THRUST CANCELLATION DEVICE FOR USE IN SOLID PROPELLANT ROCKET

Howard S. Seifert, Playa del Rey, Calif., assignor to the United States of America as represented by the Secretary of the Army Application June 28, 1955, Serial No. 518,695

12 Claims. (Cl. 102—49)

This invention relates to a thrust cancellation device for use in a solid propelent rocket.

More particularly the invention relates to a means and arrangement for neutralizing the thrust of a solid propellent rocket motor at a specific instant in the trajectory of a rocket.

The problem of achieving a desired trajectory for a guided missile is complex. It is for example, well known that a guided missile will follow a trajectory most easily if the forward thrust of the rocket power plant can be terminated upon command at a specified instant. Where the power of the rocket is generated by liquid propellants, thrust concellation can be readily carried out by shutting off the liquid propellants on command. However the development of guided missiles using solid propellent rockets has moved slowly because of the lack of suitable and practical means for quickly cancelling net thrust upon command. In a solid propellent guided missile, a rocket motor of fixed design is provided with a combustion chamber of predetermined capacity, and exit orifices or nozzles of fixed area or cross section dependent, among other things, on the type and amount of propellent, its burning rate, burning area, the amount of chamber pressure developed, etc. Hence any changes as in the amount of propellant, will obviously alter the characteristics to thereby impair the efficiency of the motor.

Accordingly, a primary need impelling the conception of this invention is a device to control the trajectory of a guided missile without affecting a change in the characteristics of the rocket motor design or in the propellent powder to initially propel the rocket into free flight.

In the direction last named a strongly inspiring need is the provision of means for neutralizing the thrust of a solid propellent rocket motor at a predetermined point in its trajectory to accord with a desired range of missile.

A further consideration in achieving its intended purpose is the provision of a rocket motor having means to provide a neutralizing force to overcome the thrust of the main nozzle of a rocket and which will operate with the least disturbance or transient force.

Yet another object in view is the provision of a thrust cancellation device for use in a solid propellent rocket wherein the rocket motor is provided with a pair of auxiliary nozzles placed symmetrically about the rocket motor chamber upstream of the main nozzle, and directed distally of and forwardly thereto, the outlets of the nozzles being fitted with frangible closures adapted to be removed rapidly and simultaneously therefrom upon command and at a predetermined point in the trajectory of the rocket.

Figure 2:
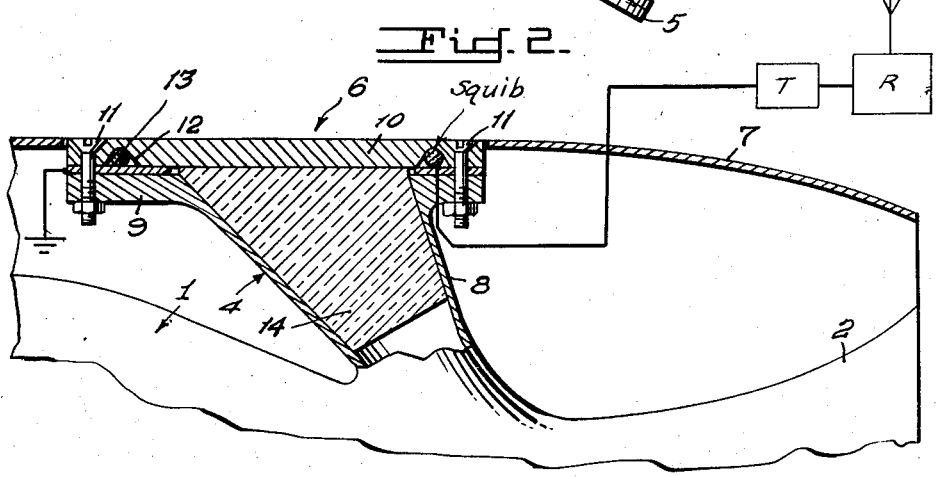
Figure 3:
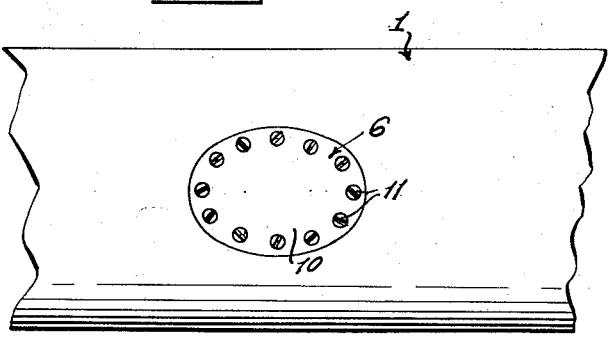

Additional objects, advantages and features of the invention reside in the construction, arrangement and combination of parts involved in the embodiment of the invention as will appear from the following description and accompanying drawings, wherein Figure 1 is a diagrammatical view of a rocket motor showing the main thrust nozzle and a pair of auxiliary nozzles, Figure 2 is a fragmentary sectional view of one form of auxiliary nozzle and showing a typical form of instantly releasable cap means, Figure 3 is a fragmentary plan view of the cap shown in Figure 2.

Figure 4 is a fragmentary sectional view through one of the auxiliary nozzles showing a cap securing means and another arrangement for instantaneously releasing the cap, Figure 5 is a top plain view of a further modified form of instantly released cap means, Figure 6 is a sectional view taken along lines 6—6 of Figure 5, Figure 7 is a fragmentary top plain view of a still further modified form of instantly releasable cap means for the auxiliary nozzle, And Figure 8 is a sectional view taken along the lines 8—8 of Figure 7.

Referring more particularly to the drawing wherein like reference characters designate like or corresponding parts throughout the different views, in Figure 1, 1 indicates generally a rocket motor chamber which is provided with a main thrust nozzle 2. Between the throat of the main nozzle 2 and the normal diametered portion 3 of the rocket motor 1, there is provided a pair of diametrically opposed nozzles 4. While only one pair of nozzles is shown in Figure 1, other pairs may be added. In the illustration of Figure 1, the nozzles have throat diameters approximately equal to the throat diameter of the main nozzle so that the throat area of each auxiliary nozzle is approximately equal to the throat area of the main nozzle, and their axes define a 120° arc with each other and 60° with the axis of the main nozzle. For other arrangements of auxiliary nozzles, it is only necessary that the areas be such the combined forward thrust be equal to the rearwardly directed main thrust. The nozzles 4 are initially closed by caps 5 which are arranged to be removed instantaneously. The size, angular relationship, and number of auxiliary nozzles are so arranged that when opened, their accumulative thrust is exactly equal to and opposite from the thrust of the main nozzle 2. Thus, at a predetermined point in the trajectory of the rocket, the auxiliary nozzles may be caused to open as later to be described to neutralize the thrust of the main nozzle.

More specifically the effect of opening the auxiliary nozzle may be explained as follows:

Consider a solid propellant with the simple burning-rate law $$r = a p_c^n$$

where $r$ is the burning rate, $p_c$ is the combustion pressure, $a$ is a constant, and $n$ is the exponent appropriate to a particular propellant. Take, for example, $n=0.5$. Add a single pair of symmetrical nozzles tilted 120° from the main thrust axis, each with throat areas $f_t$ nearly equal to the main nozzle area. It is known in the theory of solid-propellant rockets that, for the burning-rate law just stated, combustion pressure $p_c$ depends on the throat area $f_t$ and the burning-rate exponent $n$ in the following manner:

$$p_c = \text{constant.} (f_t)^{\frac{1}{n-1}}$$

Thus, if two additional identical nozzles are opened so that $f_t' = 3f_t$, the chamber pressure for the $n = 0.5$ case will drop from $p_c$ to $p_c'$ in the following ratio:

$$\frac{p_c'}{p_c} = \left(\frac{f_t'}{f_t}\right)^{\frac{1}{m-1}} = (3)^{\frac{1}{0.5-1}} = \frac{1}{9}$$

and the thrust F' exerted by each nozzle will drop to F/9, where F is the initial axial thrust. The force diagram would be as shown in the following sketch:

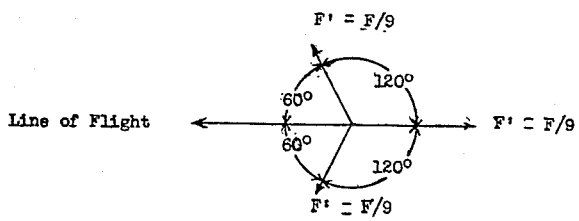

Thus the net force acting on the rocket would become nearly zero at the instant when the two auxiliary nozzles were uncapped.

It is of course essential that the auxiliary nozzles be uncapped with the least disturbance of transient force. Several arrangements and modifications are indicated to accomplish this result. The phrase "distally and forwardly" is employed in the appended claims to define the orientation of the auxiliary nozzles relative to the main nozzle. The above diagram shows one useful orientation wherein the angle between the auxiliary and main nozzle is 120°. The phrase "distally and forwardly" is hereby defined as descriptive of an orientation wherein this angle is over 90°.

In a preferred form of arrangement of the auxiliary nozzles, illustrated in Figures 1, 2, and 3, with particular reference to Figure 2, the sealing means generally indicated by 6 at the discharge end of the nozzle 4 conforms to the curvature of the rocket body or shell 1. More specifically, the discharge end 8 of the nozzle is substantially elliptical in cross section and is provided with an integral flange 9 to which is attached an elliptical cap 10 by suitable fastening members 11. The cap 10 is contoured transversely so as to be flush with the missile skin 7 to form a continuous smooth surface therewith. The elliptical cap 10 is provided with a marginal groove 12 in its under surface and forms an elliptical weakened path therein. The groove 12 contains a gas generating explosive charge 13 which is squib ignited in a manner to be later described. The cap is protected by a core of insulating material 14 filling the outer end of the nozzle 8.

Upon ignition of the explosive charge 13, the elliptical cap 10 is blown free whereupon filler 14 is also thrown clear by the gas pressure in the rocket motor to provide the necessary forward reaction by way of the auxiliary nozzles to neutralize the thrust of the main nozzle.

In the modification of Figure 4, the illustrated auxiliary nozzle 4 is provided with a frusto-conical stopper-type cap, generally indicated at 16, and having integral therewith a ground conical seal 17. The nozzle 4 is protected by a refractory plug 18 which may be bonded to the cap 16 by any suitable method. Surrounding nozzle 4 is an annular pressure retaining cylinder body 19 adapted to contain a gas generating explosive charge, not shown, or may communicate with a source of high pressure gas as at 20. This cylinder body is anchored to the nozzle 4 by a stop ring 21 integrally fastened to the nozzle. A downwardly disposed annular extension 22 on the cylinder body 19 fits snugly about the ring 21 and is externally threaded at 23 to receive a screw-threaded retaining cap 24 to secure the cylinder body 19 firmly to the ring 21. Cap 16 is further provided at its widest end with a horizontally disposed annular flange 25 weakened by annular inverted V-shaped marginal groove 26 formed in its under side thereof.

An annular shear blade 27 integral with a piston portion 28 extends upwardly to register with the annular groove 26. The piston member 28 is mounted within the cylinder body 19 to reciprocate in an annular chamber 29 formed in the body of the cylinder body 19 coaxially of nozzle 4, and is normally restrained against accidental displacement, by a pair of O-ring seals 30 and 31 received in coaxial grooves 30a and 31a formed in contiguous surfaces of piston 28 and body 19. The cylinder is provided with an annular upstanding tenon 32 externally threaded as at 33 to receive a screw-threaded annulus or retaining cap 34, provided with an annular groove 34a adapted to engage the upper surface of flange 25 of cap 16 to hold the cap firmly in place.

Upon supply of a high-pressure gas to the chamber 29 from an explosion charge connected with pipe 20 or upon ignition of an explosive charge in the chamber, the shear blade 27 is driven forward, thus severing the flange 25 of the cap 16 so that the seal 17 will be forced out of the nozzle by pressure within the rocket motor chamber as previously described.

Figures 5 and 6 illustrate another modified form of instantaneous release mechanism and include a cap 35 covering the end of an auxiliary nozzle 4, which is provided by a flange 37 contiguous the lower surface of cap 35, and has an annular groove 38 formed in its upper surface thereof to receive a sealing ring 39. The outer edges of both the cap 35 and flange 37 are correspondingly beveled on their non-contiguous surfaces for a purpose that will be described hereinafter. A three-part clamping ring generally indicated at 40 comprises three equal segments 41, each of these segments being provided with a marginal V-shaped groove 42 formed in its inner surface to thereby form a continuous groove when the segments are circumferentially arranged in an abutting position to receive the beveled edge of cap 35 and flange 37 and to secure the cap 35 to nozzle 4. Means for securely holding the segments 41 and cap 35 to the nozzle are provided and include lugs 43 extending radially from the ends of segments 41 to form pairs, each pair being transversely bored to receive explosive bolts 44. The bolts 44 are of a standard design and usually are provided with a hollow shank to receive an explosive charge (not shown). A pair of upstanding lugs 45 are provided integral with the upper surfaces of each of the segments 41 and are disposed on the opposite ends thereof to support between them a spring 46 under compression, each of which spans a corresponding joint formed by the abutting surfaces of contiguous segments 41, and supported between a corresponding pair of lugs 45. Upon firing the explosive charge in the bolts 44 the lugs 43 are ruptured and the segments 41 are thrown clear by the expansion of springs 46, wherefore cap 35 is freed to be blown clear of the nozzle 4 by pressure in the rocket motor. An insulating filler 36 is also received in the nozzle as hereinbefore described.

A still further form of cap release means is illustrated in Figures 7 and 8, wherein the nozzle 4 is provided with a horizontally disposed circumferential flange 48, upon which rests a cap 49 having an annular groove 50 formed in that portion of its under surface lying immediately above the inner periphery of the wall of nozzle 4 to receive a sealing ring 51. The cap and sealing ring are held in clamped relation to the flange 48 by a series of explosive bolts 52 similar to the bolts shown in Figures 5 and 6 and extending through vertically alined holes 52a in vertical flange 48 and cap 49. The bolts 52 are joined by suitable electrical wiring 53 connecting the bolts to a firing means later to be described. An insulating filler 54 is provided within the nozzle 47 (see Figure 8) to protect the cap. Upon ignition of the explosive bolts, the edge of cap 49 and flange 48 are shattered to release the cap from its fastenings and the nozzle is freed for operation. The explosive bolts 44, Figure 5, may be similarly connected.

Any well known expedient may be utilized to initiate the explosive charge in each species illustrated, upon command and at any specified instant. A common expedient illustrated in Figure 2, and applicable equally to each of the other modifications, comprises a receiver R adapted to receive impulses from a transmitter located on the ground, the receiver in turn being connected to an energizable thyratron firing circuit energizable to ignite a squib which in turn sets off the explosive gas generating charge in the well known manner.

It is apparent that a novel and highly efficient means has been illustrated and described to uncap the auxiliary nozzles in a guided missile utilizing a solid propellant rocket motor. In each instance the nozzles are securely closed against leakage and will not open for operation except by command and at a specified instant.

While a preferred form of the invention has been shown and described, various modifications and substitutions of equivalents will occur to those skilled in the art after a study of the foregoing disclosure. Hence, the disclosure should be taken in an illustrative rather than in a limiting sense; and it is the desire and intention to reserve all modifications within the scope of the subjoined claims.

I claim:

1. A thrust cancellation device for a rocket motor having a combustion chamber for receiving a solid propellant and comprising, a jet exhaust nozzle communicating at its forward end with said combustion chamber and having an open rear end to provide an exit for gases of propulsion axially rearwardly of said motor, means providing a plurality of gas discharge openings in the opposed side walls of said combustion chamber forwardly of said jet nozzle, an auxiliary nozzle secured about each of said openings and directed distally and forwardly of said exhaust nozzle, closure means fitted to the outlet of each said auxiliary nozzle, means including frangible means associated with each said closure to releasably secure the same in closing position on its respective auxiliary nozzle, an explosive charge for rupturing said frangible means to permit the exhaust of propulsion gases from said auxiliary nozzles, and means including a squib actuable upon command to initiate said explosive charge.

2. In a guided missile having a solid propellent rocket motor and including a combustion chamber, said missile and said combustion chamber having a longitudinal axis of symmery, a main nozzle extending axially rearwardly of said combustion chamber, a plurality of auxiliary nozzles extending from said combustion chamber distally and forwardly and upstream of said main nozzle, said auxiliary nozzles being symmetrically disposed about said longitudinal axis, cover means releasably closing the outlet of each of said auxiliary nozzles, means including frangible means for locking said cover means in closed position, and means carried by said cover means actuable upon command to shatter said frangible means to release said cover means and to permit the uncovering of each of said outlets.

3. The device of claim 2 wherein said means to shatter said frangible means comprises a gas generating explosive charge, and an electrically ignitable squib for initiating said explosive charge.

4. In a guided missile having a solid propellent rocket motor and including a combustion chamber, said missile and said combustion chamber having a longitudinal axis of symmetry, a main nozzle extending axially rearwardly of said combustion chamber, a pair of auxiliary nozzles extending from said combustion chamber distally and forwardly and upstream of said main nozzle, said auxiliary nozzles being symmetrically disposed about said longitudinal axis, cover means releasably closing the outlet of each of said auxiliary nozzles, means including frangible means for locking said cover means in closed position, and means carried by said cover actuable upon command to shatter said frangible means to release said cover means to permit the uncovering of each of said outlets.

5. The device of claim 4 wherein said means to shatter said frangible means comprises a gas generating explosive charge, and an electrically ignitable squib for initiating said explosive charge.

6. The device of claim 4 wherein each of said auxiliary nozzles provides a throat area substantially equal to the throat area of said main nozzle, each of said auxiliary nozzles having an axis of symmetry forming an angle of 120 degrees with the main thrust axis of said missile.

7. In a guided missile a thrust cancellation device for use in a solid propellant rocket motor and including a rocket chamber, a main nozzle extending axially rearwardly of said rocket chamber, a plurality of auxiliary nozzles symmetrically disposed about the rocket chamber upstream from said main nozzle and directed distally of and forwardly thereto, each of said auxiliary nozzles provided with an elliptical flanged discharge end flush with the outer surface of said missile, a substantially elliptical cap member having a marginal groove cut in its under surface thereof, an explosive charge received in said marginal groove, fastening members normally securing said cap and explosive charge on the flanged end of each of said auxiliary nozzle, said explosive charge being squib ignited to fracture said cap member in the vicinity of said marginal groove to uncover the discharge end of each of said auxiliary nozzles.

8. The device of claim 7, and a protecting insulating material for said cap member normally filling the discharge mouth of each of said nozzles, and expellable by gases of propulsion in said rocket chamber upon the uncovering of each said discharge end.

9. In a thrust cancellation device for use in a solid propellant rocket including a rocket chamber and a main nozzle, a plurality of auxiliary nozzles symmetrically arranged about the rocket chamber upstream from the main nozzle and directed distally of and forwardly thereto, frangible closures fitted to the discharge of each end of said auxiliary nozzles and comprising a conical seal portion extending downwardly into said auxiliary nozzle, and a horizontally disposed annular flange portion having a marginal annulus cut in its under surface thereof, a refractory protecting material bonded to the under side of said seal portion and filling the discharge end of said auxiliary nozzle, an outer cylindrical body member surrounding said auxiliary nozzle, an anchoring member integrally affixed to said auxiliary nozzle, means for securing the lower portion of said cylindrical body member in threadable engagement to said anchoring member, means for securing said frangible closure member to said auxiliary nozzle and threadably engaging the upper portion of said cylindrical body member, there being an annular chamber formed within said cylindrical body member, an inner cylindrical member defining a piston portion at its lower end and an upstanding annular blade portion at its upper portion thereof, said lower piston portion adapted for reciprocation within said annular chamber, said blade portion registering within said annulus in said closure members, and a pair of co-axially arranged shear rings normally retaining said inner cylindrical body from accidental displacement and interposed between said piston portion of said cylindrical member and said outer cylindrical member.

10. The device of claim 9, said plurality of auxiliary nozzles comprising a pair, each nozzle having an axis of symmetry disposed at 120 degrees to the thrust axis of said main nozzle, each said auxiliary nozzle having a throat area substantially equal to the throat area of said main nozzle.

11. A thrust cancellation device for use in a solid propellent rocket motor having a combustion chamber, a main nozzle extending axially rearwardly of said combustion chamber, a plurality of auxiliary nozzles symmetrically disposed about said combustion chamber and upstream from said main nozzle and directed distally of and forwardly thereto, each said auxiliary nozzle having a marginal flange adjacent its discharge end, releasable closure means for each auxiliary nozzle comprising, a disc-shaped cap spanning each discharge end and having its peripheral under surface engaging said flange, there being vertically alined circumferentially arrayed bores extending through said flange and said cap, a plurality of explosive bolts received in said bores, and means including an electrically ignitable squib energizable upon command to initiate said explosive bolts, whereby said closure means are released to be blown clear of each of said auxiliary nozzles.

12. The device of claim 11, said plurality of auxiliary nozzles being a pair, each said auxiliary nozzle forming an angle of 120 degrees with the main thrust axis and having a throat area substantially equal to the throat area of said main nozzle.

References Cited in the file of this patent

UNITED STATES PATENTS

| | | |
|---|---|---|
| 2,515,049 | Lauritsen et al. | July 11, 1950 |
| 2,728,295 | Rubin et al. | Dec. 27, 1955 |